Oct. 11, 1927.

E. J. MADDEN 1,645,438

AUTOMOBILE WINDSHIELD

Filed Dec. 7, 1922

2 Sheets-Sheet 1

Inventor

Edward J. Madden

By Edward N. Pagelsen

Attorney

Oct. 11, 1927.
E. J. MADDEN
AUTOMOBILE WINDSHIELD
Filed Dec. 7, 1922
1,645,438
2 Sheets-Sheet 2
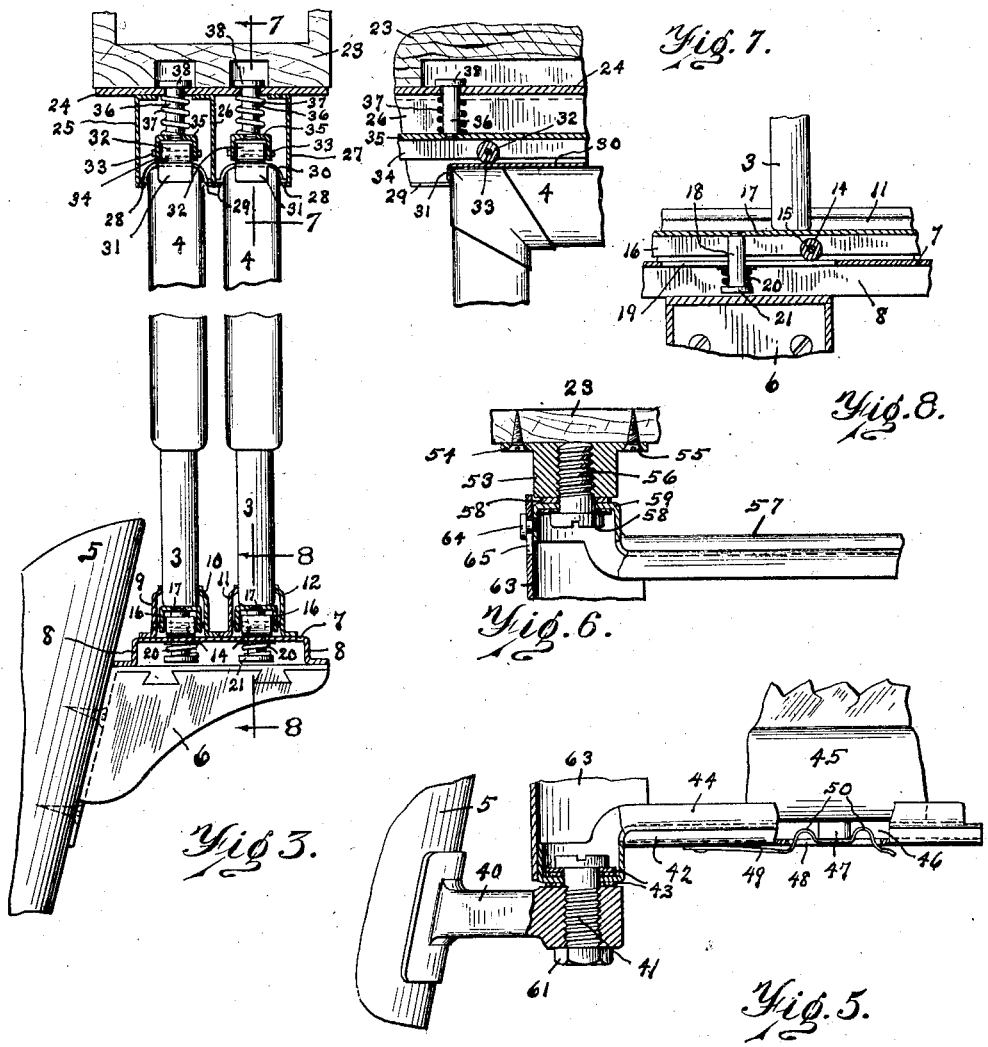
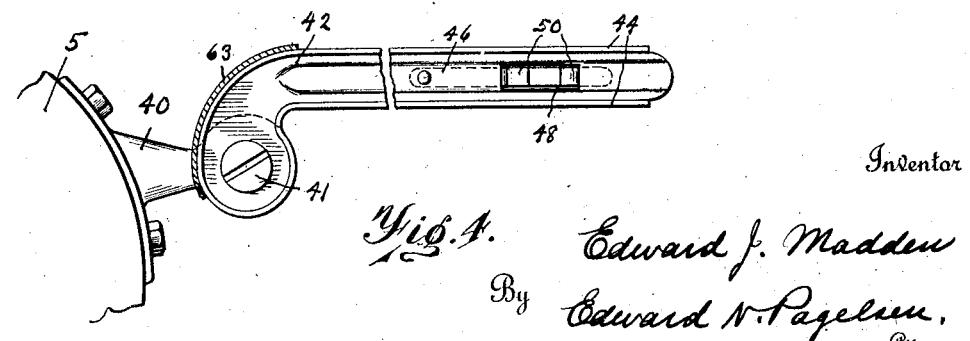
Inventor
Edward J. Madden
By Edward N. Pagelsen,
Attorney Patented Oct. 11, 1927.

1,645,438

UNITED STATES PATENT OFFICE.

EDWARD J. MADDEN, OF DETROIT, MICHIGAN.

AUTOMOBILE WINDSHIELD.

Application filed December 7, 1922. Serial No. 605,346.

This invention relates to the construction of and the supporting means for panels adapted to be mounted at the backs of the front seats of open-top motor vehicles to shield the occupants of the rear seats from the wind, and its object is to provide a construction of this character which will have two removable and pivoted side panels which can be positioned at any desired angle and two removable and slidably adjustable central panels which can be positioned to extend across the space between the side panels or any desired part thereof.

In my co-pending application Ser. No. 604,685, filed December 4, 1922, I have shown a top for an automobile provided with wall and door panels which consist of frames and sheets of glass mounted in the frames, the frames which are attached to the doors having long pins extending into proper holes in the top edges of the doors and the wall frames which are mounted adjacent the door panels on the rigid portions of the body of the vehicle having shorter pins which engage in holes along the top rail of the body and other pins which are engaged by proper members along the outer or lateral edges of the deck of the top.

The present invention consists in pairs of brackets, one bracket of each pair being pivotally attached to the back of the front seat of the automobile and the other bracket of each pair being pivoted in alinement with its mate to a rigid transverse member in the deck of the top, and means mounted on one of said pivoted brackets of each pair to secure one of the panels between each pair of brackets.

It further consists in a pair of guide rails, one attached to the back of the front seat and the other to said transverse member of the deck of the top, to receive other panels, the pivoted and transversely mounted panels together constituting a windshield.

It also consists in the details of construction illustrated in the accompanying drawings and particularly pointed out in the claims.

Figure 1:
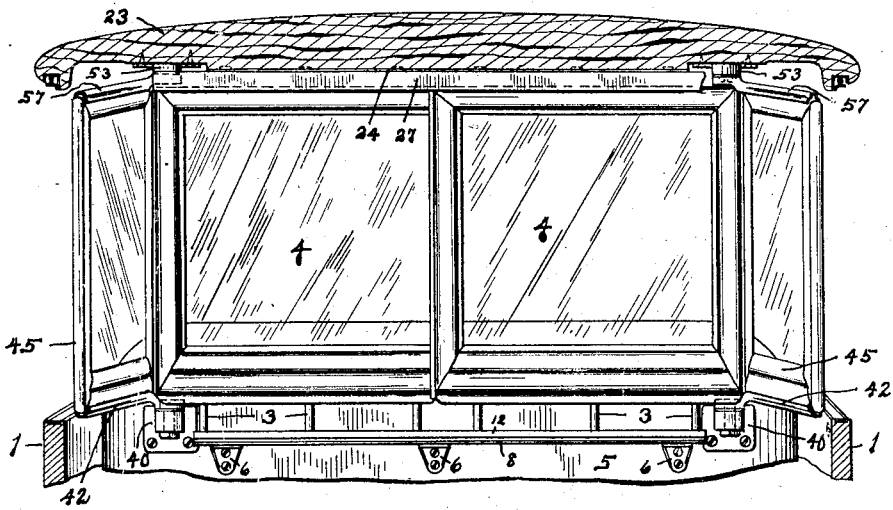
Figure 2:
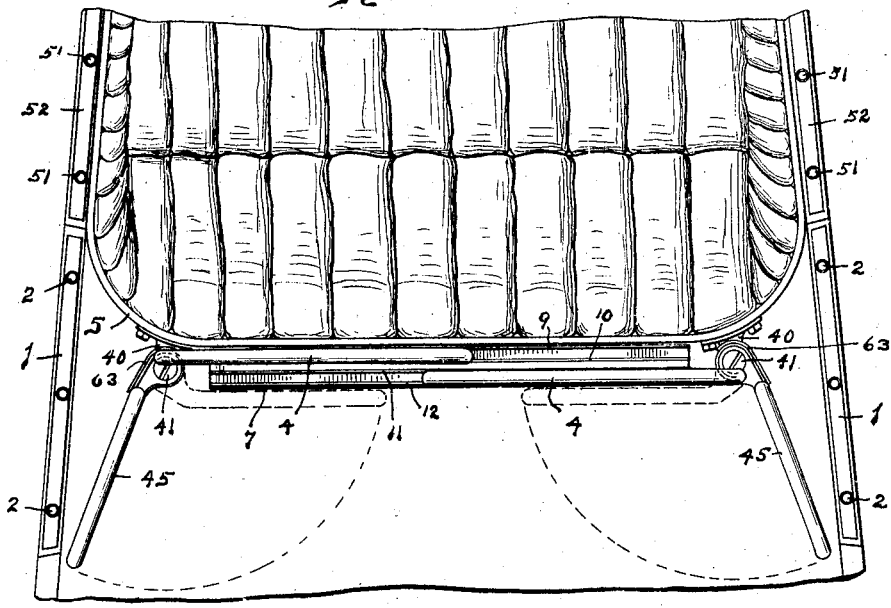

In the drawings, Fig. 1 is a rear elevation of my improved tonneau windshield and the parts supporting it. Fig. 2 is a plan of this windshield and of the front seat-back. Fig. 3 is a side elevation of the middle panels of this windshield and a vertical section of the supports therefor. Fig. 4 is a plan of a supporting bracket for one of the pivoted panels. Fig. 5 is an elevation thereof, parts being broken away for clearness. Fig. 6 is a vertical section of the pivot portion of an upper bracket which supports one of the side panels. Figs. 7 and 8 are sections on the lines 7—7 and 8—8 of Fig. 3 respectively.

Similar reference characters refer to like parts throughout the several views.

In Fig. 2, the doors 1 are shown formed with holes 2 to receive the downwardly extending pins 3 on the door panels 4, shown in Fig. 1, and these door panels are of sufficient size to close the spaces between the doors and the deck of the top, as fully described in my co-pending application. The pins 3 on these panels are of sufficient length to alone secure the panels to the doors. The details of construction of the frames of these panels and the character of the transparent sheets 4 form no part of the present invention, excepting that the pins 3 extending down from the panels constitute part of the means whereby these panels are held in place.

Attached to the back 5 of the front seat of the vehicle are the brackets 6, formed in any desired manner, and secured to these brackets is a rail consisting of a web or top plate 7 and the side flanges 8. Mounted on this rail are the pairs of guide plates 9, 10, 11 and 12, the upper edges of the pairs being spaced apart sufficiently to receive the pins 3 on the panels. Mounted on the top plate 7 of the rail are the rollers 14 which are positioned by the pins 15 that extend through holes in the flanges 16 of the channel 17 on which the pins 3 rest. In order to prevent rattling, the pins 18 are connected to the web of this channel 17 and these pins extend through slots 19 in the top plate 7 of the supporting rail. Springs 20 between the heads 21 of these pins and the plate 7 hold down the channel 17 and the rollers 14 but permit endwise movement of the panels.

Attached to the transverse member 23 of the deck of the top is a plate 24 which carries the guides 25, 26 and 27, the first and last having inturned flanges 28 and the guide 26 having flanges 29 extending both ways. Mounted between these guides are the channels 30 adapted to receive the upper edges of the panels and of such width that they cannot pass the flanges 28 and 29 of the guides 25, 26 and 27. These channels have down-turned lips 31 adapted to extend over the ends of the panels 4, as indicated in Figs. 3 and 7, to cause the channels to move with the panels.

Rollers 32 are mounted on pins 33 carried by the flanges 34 of the spring held channels 35 and these channels are attached to the pins 36 slidably mounted in the plate 24 and carrying the springs 37. The heads 38 of the pins limit the downward movement of these rollers.

Additional brackets 40 are attached to the seat-back 5 and these receive the screws 41 which pivotally secure the arms 42 to the brackets 40, bearing washers 43 being provided. The arms 42 are in the form of channels having side walls 44 to guide the wall panels 45 and having grooves 46 in their bottoms to receive the short pins 47 that extend down from these panels and serve to secure the panels to the side walls 52 of the body by entering the holes 51 therein. In order to prevent endwise movement of the panels after being properly positioned, slots 48 may be cut in the bottoms of these arms and a leaf spring 49 attached to each arm, the springs having ears 50 to receive pins 47 between them and so prevent endwise movement of the panels relative to these arms.

Attached to the transverse member 23 of the deck frame are two inverted pedestals 53 having perforated flanges 54 which receive the screws 55 and also having screw-threaded holes to receive the pivot screws 56. The channel shaped arms 57 have heads 59 pivoted on these screws 56, washers 58 being provided if desired to stiffen the head. The screws 56 and 41 are in alinement so that the panels 45 when mounted between the arms 42 and 57 may swing freely, the paths being indicated by dotted lines in Fig. 2. A lock nut 61 may be provided for each screw 41 to prevent this screw from turning and one or more of the washers 43 and 58 for each panel may be the well known spring washers.

It will be observed that with the exception of the brackets 40 and the pedestals 53, which may be simple castings, substantially all the parts are sheet metal stampings and therefore may be easily and cheaply produced. In order to prevent a blast of air passing between the adjacent edges of the panels 4 and 45, an upright narrow shield 63 of sheet metal may be spot-welded at its lower end to each arm 42 and be secured at its upper end to the head 59 of an arm 57. This connection is preferably made by a screw 64 extending through a slot 65 in the shield 63 so that unusual twisting of the body and top will not break the connection between these shields and the supporting arms for the panels.

The two panels 4 may be positioned so that their inner edges overlap or may be moved endwise so that an opening of any desired width may be had between them or between either one and the adjacent pivoted panel. The panels 4 may be positioned by pressing their upper edges against the channels 30 and lifting them until the pins 3 can be swung over the lower guides and positioned between them. The pivoted panels 45 are merely slid in between the pivoted arms until the pins 47 are engaged by the springs 49.

The details of construction and the proportions of the parts may all be changed by those skilled in the art without departing from the spirit of my invention as set forth in the following claims.

I claim:—

1. In a vehicle, the combination of a body, a pair of guides extending across the body, a vertical panel mounted between the guides, a longitudinally movable support for the panel permanently mounted between said guides and movable with or independently of the panel, a top for the body, a pair of guides attached to said top and extending transversely thereof, one on each side of the upper edge of the panel, and a resiliently mounted strip of sheet metal between the guides and engaging said panel.

2. In a vehicle, the combination of a body and a seat-back extending across the body, an arm pivoted to each end of the back, a top for the body, an arm pivoted to said top above each of the arms pivoted to the back and in alinement therewith, each of said arms being grooved, and panels slidable into the grooves of said arms comprising frame members and glass panes supported thereby.

3. In a vehicle, the combination of a body and a seat-back extending across the body, an arm pivoted to each end of the back, a top for the body, an arm pivoted to said top above each of the arms pivoted to the back and in alinement therewith, each of said arms being grooved, and panels slidable into the grooves of said arms and having downwardly extending pins and springs mounted in said lower arms and adapted to engage said pins to hold the panels in position.

4. In a vehicle, the combination of a body, a guide extending across the body and embodying a plurality of channels, a top for the body, a guide attached to the top and embodying a plurality of channels, and a plurality of panels slidably mounted in said channels and each having pins extending downwardly from their lower edges into said channels and slidable therein, said body being provided with recesses along its upper edge to receive said pins whereby the panels may be positioned in rain-excluding position.

5. In a motor vehicle, the combination of a body and a seat-back extending across the body, a guide secured to the back of the seat, a top for the body and a guide secured to the top above the guide attached to the seat-back, panels mounted in said guides, an arm pivoted to the back at each end of the guide thereon, an arm pivoted to the top at each end of the guide thereon, the pivots of the arms on each side of the vehicle being in alinement, and panels mounted in said arms at each side of the first named panels.

6. In a motor vehicle, the combination of a body and a seat-back extending across the body, a guide secured to the back of the seat, a top for the body and a guide secured to the top above the guide attached to the seat-back, panels slidably mounted in said guides, an arm pivoted to the back at each end of the guide thereon, an arm pivoted to the top at each end of the guide thereon, the pivots of the arms on each side of the vehicle being in alinement, panels mounted in said arms at each side of the first named panels, and weather strips attached to the lower arms and extending to the arms above them and adapted to close the spaces between the pivoted panels and the slidable panels.

EDWARD J. MADDEN.